(12) United States Patent
Lee et al.

(10) Patent No.: US 8,200,811 B2
(45) Date of Patent: Jun. 12, 2012

(54) AUTOMATIC SERVER ADMINISTRATION OF SERIAL NUMBERS IN A REPLICATED CERTIFICATE AUTHORITY TOPOLOGY

(75) Inventors: Ade Lee, Cary, NC (US); Christina Fu, Saratoga, CA (US); Andrew Wnuk, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 170 days.

(21) Appl. No.: 12/571,369

(22) Filed: Sep. 30, 2009

(65) Prior Publication Data

US 2011/0078304 A1    Mar. 31, 2011

(51) Int. Cl.
G06F 15/16 (2006.01)
G06F 12/00 (2006.01)
(52) U.S. Cl. ....................................... 709/224; 709/203
(58) Field of Classification Search .................. 709/203, 709/223–229, 250
See application file for complete search history.

(56) References Cited

U.S. PATENT DOCUMENTS

| 5,832,512 | A * | 11/1998 | Mastors et al. ........ 707/999.202 |
| 5,890,154 | A | 3/1999 | Hsiao et al. |
| 6,446,092 | B1 | 9/2002 | Sutter |
| 6,671,821 | B1 | 12/2003 | Castro et al. |
| 2003/0037234 | A1* | 2/2003 | Fu et al. ........................ 713/158 |
| 2006/0153211 | A1* | 7/2006 | Fujino ........................... 370/401 |
| 2008/0172429 | A1* | 7/2008 | Lin et al. ....................... 707/205 |
| 2009/0037388 | A1* | 2/2009 | Cooper et al. .................... 707/3 |
| 2011/0078198 | A1* | 3/2011 | Lee et al. ........................ 707/783 |

OTHER PUBLICATIONS

Red Hat Office Action for U.S. Appl. No. 12/571,393, mailed Oct. 7, 2011.

* cited by examiner

Primary Examiner — Zarni Maung
(74) Attorney, Agent, or Firm — Lowenstein Sandler PC

(57) ABSTRACT

A Serial Number Management System (SNMS) automatically manages the allocation of unique serial numbers to certificate authority servers in a replicated server environment. The SNMS automatically detects that a Certificate Authority (CA) server has a need for additional unused serial numbers. The SNMS identifies a provider CA server that has unused serial numbers. The SNMS obtains a portion of the unused serial numbers from the provider CA server.

22 Claims, 8 Drawing Sheets

AUTOMATIC SERVER ADMINISTRATION OF SERIAL NUMBERS IN A REPLICATED CERTIFICATE AUTHORITY TOPOLOGY

RELATED APPLICATION

The present application is related to co-filed U.S. patent application Ser. No. 12/571,393 entitled "Automatic Serial Number and Require ID allocation in a Replicated (Cloned) Certificate Authority and Data Recovery Management Topology", which is assigned to the assignee of the present application.

TECHNICAL FIELD

Embodiments of the present invention relate to certificate authority servers. Specifically, the embodiments of the present invention relate to a method and system for automatic server administration of serial numbers in a replicate certificate authority topology.

BACKGROUND

A certificate system provides a security framework to ensure that network resources are accessed by authorized users. The certificate system is capable of generating digital certificates (certificates) for different users to verify the identity of a presenter. The certificate system can include interoperating subsystems to perform various Public Key Infrastructure (PKI) operations, such as issuing, renewing, suspending, revoking, archiving and recovering keys, publishing Certificate Revocation Lists (CRLs), verifying certificate status, and managing the certificates that are needed to handle strong authentication and secure communications. The certificate system can include a Certificate Authority (CA) subsystem to issue and revoke certificates, a Data Recovery Manager (DRM) subsystem to recover lost keys, an Online Certificate Status Responder (OCSP) subsystem to verify whether a certificate is valid, a Registration Authority (RA) subsystem to accept certificate requests and verify whether a request should be approved, a Token Key Service (TKS) subsystem to format tokens and process certificates on a token, and a Token Processing System (TPS) to manage certificates on tokens.

A CA subsystem issues certificates which each having a unique serial number. An initial CA subsystem can be cloned to support large deployments to create a high availability certificate system that includes multiple CA subsystems. Each CA subsystem can receive certificate requests and issue certificates. To ensure that each certificate that is issued has a unique serial number, each CA subsystem must have a range of serial numbers that is unique from any other CA subsystem. The current state of the art, however, does not provide a way to efficiently manage the allocation of serial numbers to CA subsystems in a high availability certificate system that includes hundreds of cloned CA subsystems.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of the invention are directed to a method and system for automatically managing the allocation of unique serial numbers to certificate authority servers in a replicated server environment. A Serial Number Management System (SNMS) automatically detects that a Certificate Authority (CA) server has a need for additional unused serial numbers. The SNMS identifies a provider CA server that has unused serial numbers. The SNMS generates a request to obtain a portion of the unused serial numbers from the provider CA server. The SNMS replicates the request to the provider CA server and determines whether the request is approved by the provider CA server. The SNMS obtains the portion of unused serial numbers from the provider CA server if the request was approved, or identifies a new provider CA server to send a new request for additional unused serial numbers to if the request was not approved.

Figure 1:
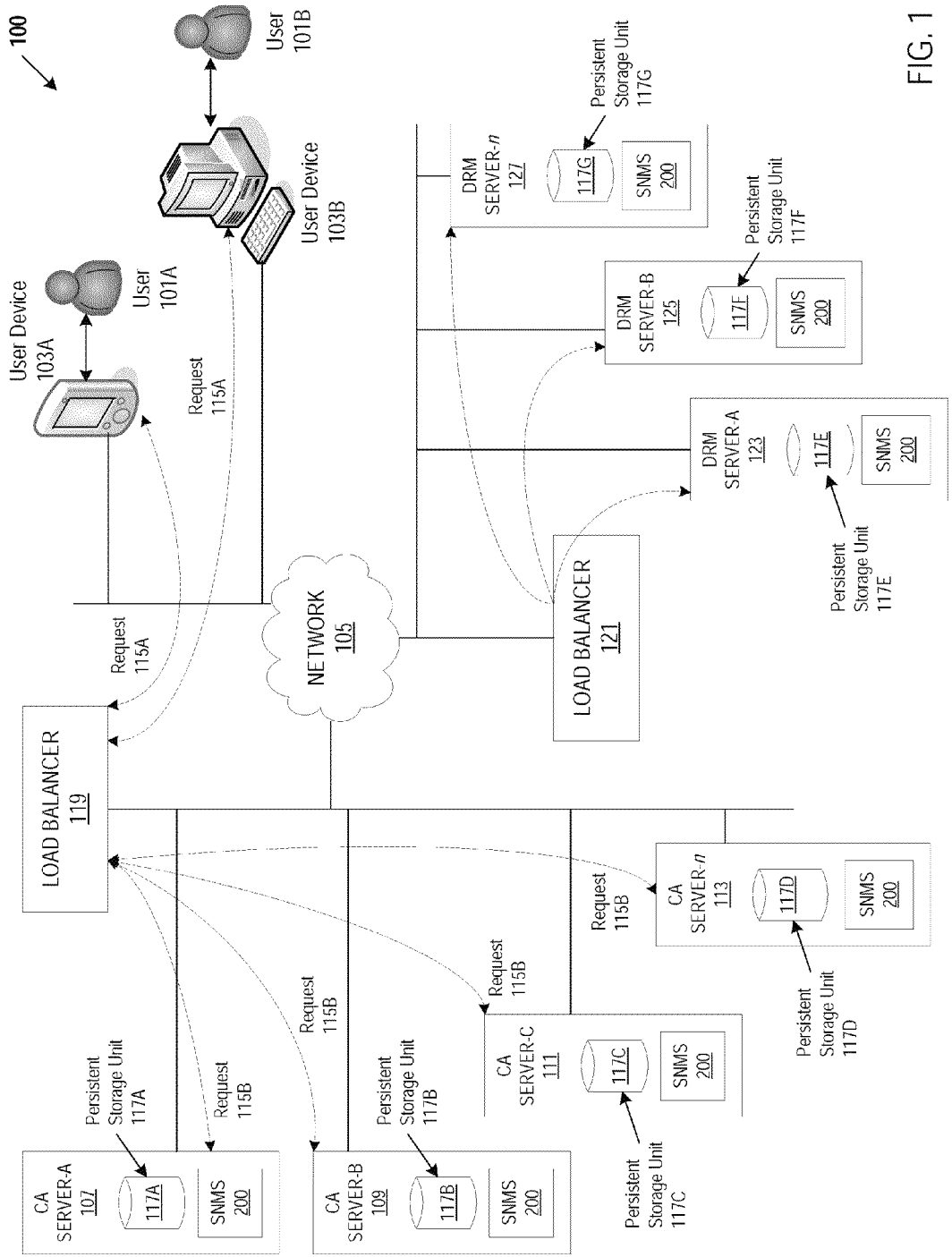
FIG. 1 illustrates an exemplary network architecture in which embodiments of the present invention may operate.

FIG. 1 illustrates an exemplary network architecture on which embodiments of the present invention can be implemented. User devices 103A,B for users 101A,B are coupled to a network 105. User devices 103A,B can be a smart hand-held device or any type of computing device including desktop computers, laptop computers, mobile communications devices, cell phones, smart phones, hand-held computers or similar computing device capable of transmitting certificate requests and receiving certificates. The network 105 can be a wide area network (WAN), such as the Internet, a local area network (LAN), such as an intranet within a company, a wireless network, a mobile communications network, or a similar communication system. The network 105 can include any number of networking and computing devices such as wired and wireless devices.

A high availability certificate system 100 includes an initial Certificate Authority (CA) server 107 and one or more clones 109,111,113 of the initial CA server 107. An initial CA server 107 is typically the first CA server that is configured in a high availability certificate system 100. A CA server can be any type of computing device including server computers, desktop computers, laptop computers, hand-held computers, or similar computing device. An initial CA server 107 is duplicated, or cloned, so that one or more clones 109-113 are set up in an identical manner. The high availability certificate system 100 can include hundreds of clones 109-113 of the initial CA server 107.

A user 101A,B sends a certificate request 115A over network 105. A CA server 107-113 receives certificate requests from users 101A,B, and generates and manages the certificates. The high availability certificate system 100 provides fail over support by ensuring that certificate requests are processed even if one of the CA servers 107-113 is unavailable. In one embodiment a load balancer 119 receives certificate requests 115A from users 101A,B and directs the requests 115B appropriately between the multiple CA servers 107-113. The load balancer can be part of a server machine, a gateway, etc. In the event that a CA server fails, the load balancer 119 can transparently redirect all requests to a CA server that is still operational.

A CA server 107-113 includes a persistent storage unit 117 (117A,B,C,D) for storing information such as certificates, requests, users, roles, access control lists (ACLs), and other information. The persistent storage unit 117 also stores serial number data. A persistent storage unit 117 can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items including one.

The high availability certificate system 100 can store serial number data using a directory that stores all of the information in a single, network-accessible repository. The directory can be a directory that uses a Lightweight Directory Access Protocol (LDAP) protocol. However, it is expressly contemplated that any appropriate directory and directory service can be enhanced for use in accordance with the allocation architecture described herein. The high availability certificate system 100 can communicate with an internal LDAP-based database securely through SSL client authentications.

Figure 2:
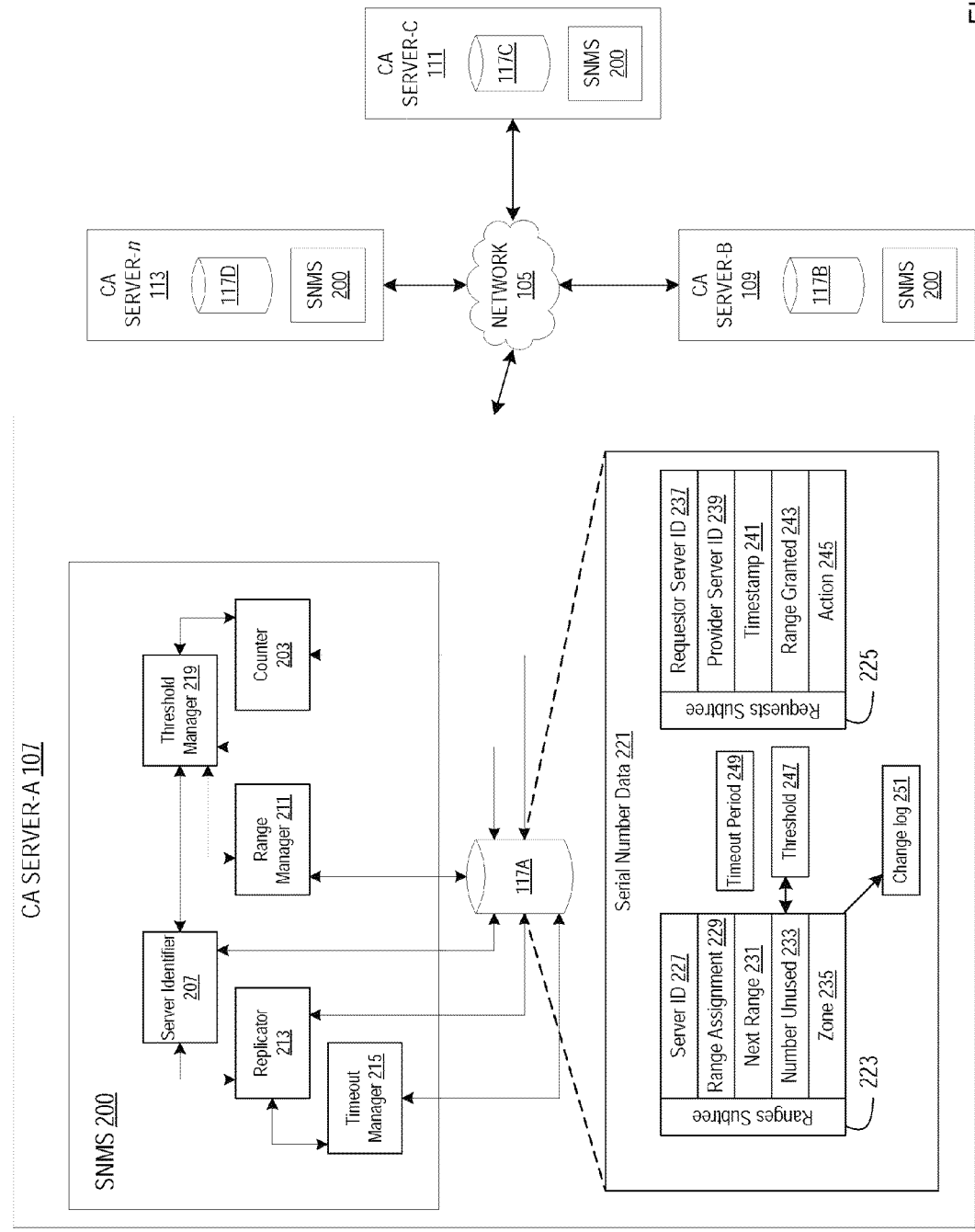
FIG. 2 illustrates a diagrammatic representation of a serial number management system, in accordance with one embodiment of the present invention.
Figure 5:
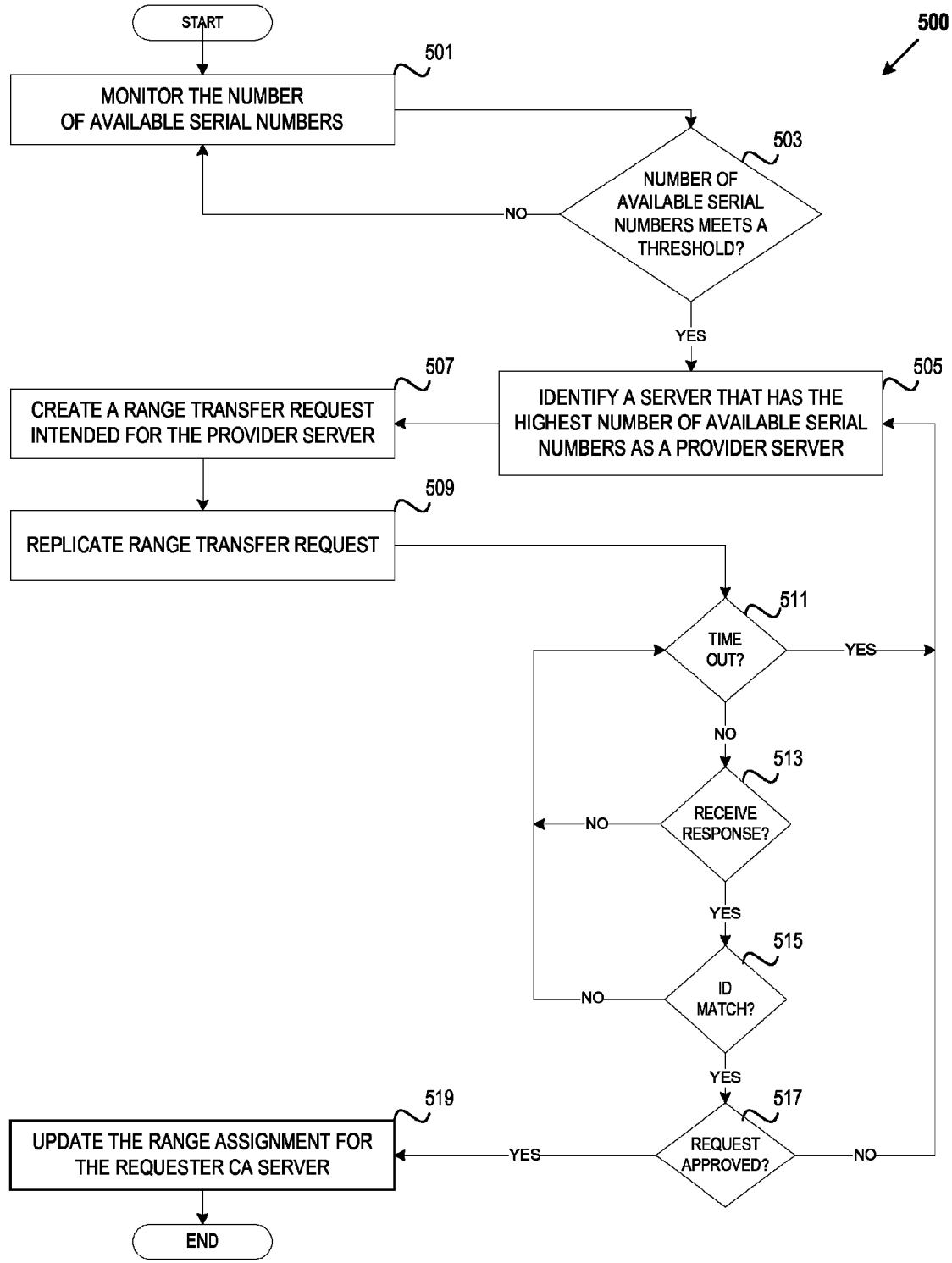
FIG. 5 is a flowchart which illustrates an embodiment of a method for automatically requesting and obtaining additional serial numbers.

Each CA server 107-113 includes a Serial Number Management System (SNMS) 200. An initial CA server and the multiple clone CA servers use the same CA signing certificate, but each CA server issues certificates from a different set of serial numbers. A SNMS 200 automatically manages the allocation of unique serial numbers to the multiple CA servers 107-113 in the high availability certificate system 100. A SNMS 200 can automatically detect that a CA server has a need for unused serial numbers. FIG. 2 and FIG. 5 describe how the SNMS 200 can automatically detect the CA server has a need for unused serial numbers in greater detail below. An unused serial number is a serial number that has not been assigned by a CA server to a certificate. The SNMS 200 identifies a provider CA server, from multiple CA servers in a replication domain, that has unused serial numbers. A replication domain is a group of CA servers that replicate data to each other. The SNMS 200 replicates a request to the other CA servers such that the provider CA server receives the request. The SNMS 200 obtains a portion of unused serial numbers from the provider CA server if the request was approved or identifies a new provider CA server to send a new request for additional unused serial numbers to if the request was not approved.

When an initial subsystem is cloned, the initial subsystem needs to be able to assign serial numbers immediately to a clone. To be able to do this, the initial subsystem can transfer a portion of its serial numbers from its current range of serial numbers to the cloned system. The SNMS 200 can also be used to issue and manage replication identifiers (IDs). When a subsystem is cloned, such as a CA server, the initial subsystem and each clone of the initial subsystem has a unique replication ID. The SNMS 200 can be used to ensure that each subsystem in a replication topology has a unique replication ID.

The high availability certificate system 100 can also include an initial Data Recovery Manager (DRM) server 123 and clones of the initial DRM server 125,127. A DRM server can be any type of computing device including server computers, desktop computers, laptop computers, hand-held computers, or similar computing device. Each DRM server 123-127 stores keys and certificates for recovering the keys if a token is lost or damaged. A DRM server 123-127 can include a SNMS 200 to issue and manage unique serial numbers for each key issued by a DRM server. CA servers 107-113 communicate with DRM servers 123-127 for recovering certificates. In one embodiment, CA servers 107-113 communicate with DRM servers 123-127 via a load balancer 121.

FIG. 2 is a block diagram illustrating an embodiment of a Serial Number Management System (SNMS) 200 for automatically managing the allocation of serial numbers to multiple certificate authority (CA) servers. Each CA server 107-113 includes a SNMS 200, and a persistent storage unit 117 (117A,B,C,D) to store data. The data in the persistent storage unit can be stored in an LDAP-based database. CA Server-A 107 is an initial CA server and CA Servers-B,C,n are clones of the initial CA server. Entries in each LDAP-based database 117A-D can be replicated to the other CA servers in a replication domain. A replication domain is a group of CA servers that replicate data to each other. For example, CA Servers-A, B,C,n are in the same replication domain.

A SNMS 200 includes a server identifier 207, a range manager 211, a replicator 213, a counter 203, a threshold manager 219, and a timeout manager 215. This division of functionality is presented by way example for sake of clarity. One skilled in the art would understand that the functionality described could be combined into a monolithic component or sub-divided into any combination of components.

Each CA server is assigned a unique range of serial numbers. A range manager 211 manages the range of serial numbers for a CA server by creating and updating entries in the serial number data 221. The serial number data 221 can include a replicated subtree for tracking ranges (range subtree 223) and a replicated subtree for range transfer requests (requests subtree 225) in the LDAP-based database 117A. Although not illustrated in FIG. 2, there is one entry for each CA server in the ranges subtree 223. Examples of the data included in an entry for a CA server include a Server ID 227, a Range Assignment 229 for the CA server, a Next Range assignment 231, a Number Unused 233, and Zone 235 data for the CA server. The Server ID 227 is a unique identifier that identifies the CA server. The Zone 235 data includes a list of preferred CA servers which is described in greater detail below in conjunction with FIGS. 4A-4B.

The range manager 211 creates an entry for a range transfer request in the requests subtree 225. Although not illustrated in FIG. 2, there is one entry for each range transfer request that is made. Examples of the data included in an entry for a range transfer request includes a Server ID 237 of a CA server requesting additional unused serial numbers, a Server ID 239 of a server that may provide additional unused serial numbers, a Time Stamp 241 indicating the time the entry was created, a Range Granted 243 field identifying the range of unused serial numbers being transferred between CA servers, and an Action 245 field indicating whether a range transfer request was approved, rejected, or timed out.

The range manager 211 also detects if a CA server is removed from a high availability certificate system and manages the recovery of the unused serial numbers previously assigned to the removed CA server. The range manager 211 on a CA server that is being removed can receive user input (e.g., from a system administrator) to remove its serial number data from an LDAP-based database. The range manager 211 can delete the entries in that LDAP-based database that correspond to the CA server that is being removed. The range manager 211 can reallocate the remaining unused serial numbers from the removed CA server to an active CA server. For example, the range manager 211 can determine which CA server has the lowest number of unused serial numbers and allocate the unused serial numbers from the removed CA server to it.

A counter 203 determines the number of unused serial numbers for a CA server. As a CA server issues certificates, the counter 203 keeps track of the number of unused serial numbers for that particular CA server. The number of unused serial numbers for a CA server can be stored in the Number Unused 233 field in the range subtree 223 in the LDAP-based database 117A.

A replicator 213 replicates the entries in the range subtree 223 and the entries in the requests subtree 225 for a CA server to all of the other CA servers in the replication domain. For example, the replicator 213 of CA Server-A 107 replicates the ranges subtree 223 and the requests subtree 225 of CA Server-A 107 to CA servers-B,C,n. The replication of the ranges subtree 223 of each CA server to the other CA servers enables all of the CA servers to identify which ranges of serial numbers are used and which ranges of serial numbers are not used. The replication of the requests subtree 225 of each CA server to other CA servers enables all of the CA servers to transfer portions of unused serial number ranges between the CA servers. Each CA server is responsible for recording changes made to the LDAP-based database it manages. The changes can be maintained in a change log 251.

A server identifier 207 identifies a CA server from the CA servers in the replication domain that has the highest number of unused serial numbers. A CA server that has a need for unused serial numbers is a requester CA server. A CA server that can potentially provide unused serial numbers to a requester CA server is a provider CA server. The entries in the range subtree 223, including the Number Unused 233, in the LDAP-based database 117A are replicated to other LDAP-based databases. The server identifier 207 can search the LDAP-based database 117 to identify a provider CA server (a server that has the highest number of unused serial numbers).

A threshold manager 219 automatically detects whether a CA server has a need for additional unused serial numbers. The threshold manager 219 compares the number of unused serial numbers 233 calculated by the counter 203 to a threshold 247 to determine whether the CA server has reached a low-water mark threshold. The threshold 247 can be stored in an LDAP-based database 117A. The threshold 247 can be a user-defined value (e.g., 100).

A timeout manager 215 determines whether a timeout period 249 has expired. A timeout period 249 defines a period of time for a requester CA server to wait for a response to a range transfer request before the requester CA server can generate a new range transfer request. The timeout period 249 can be stored in the LDAP-based database 117A. The timeout period can be a user-defined time period (e.g., 10 seconds).

The server identifier 207, the range manager 211, the replicator 213, the counter 203, the threshold manager 219, and the timeout manager 215 can be implemented as hardware, computer-implemented software, firmware or a combination thereof. In one embodiment, the server identifier 207, the range manager 211, the replicator 213, the counter 203, the threshold manager 219, and the timeout manager 215 comprise instructions stored in memory 804 that cause a processing device 802 in FIG. 8 described in greater detail below to perform the functions of the server identifier 207, the range manager 211, the replicator 213, the counter 203, the threshold manager 219, and the timeout manager 215.

Figure 3:
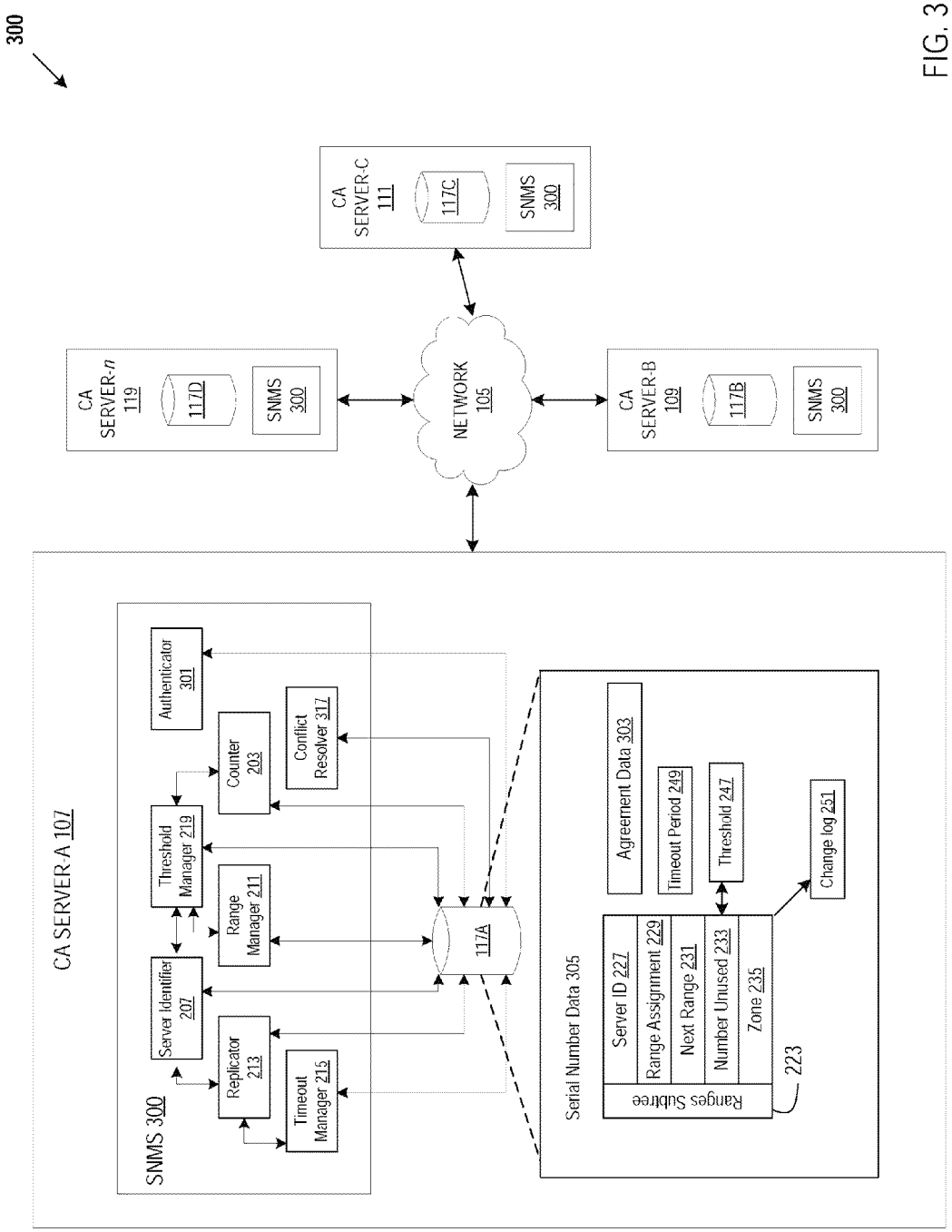
FIG. 3 illustrates a diagrammatic representation of a serial number management system, in accordance with one embodiment of the present invention.

FIG. 3 is a block diagram illustrating another embodiment of a Serial Number Management System 300 for automatically managing the allocation of serial numbers to multiple certificate authority servers. Each CA server 107-113 includes a SNMS 300, and a persistent storage unit 117 (117A,B,C,D) to store data.

Similar to the embodiment of a SNMS 200 illustrated in FIG. 2, a SNMS 300 includes a server identifier 207, a range manager 211, a replicator 213, a counter 203, a threshold manager 219, and a timeout manager 215. This embodiment further includes an authenticator 301 and a conflict resolver 317. This division of functionality is presented by way example for sake of clarity. One skilled in the art would understand that the functionality described could be combined into a monolithic component or sub-divided into any combination of components.

In this embodiment, a range transfer request is managed using replication agreements between CA servers. A replication agreement describes replication between two servers. The agreement is configured and stored on the CA server that makes a change to the data in an LDAP-based database that is to be replicated. The agreement can be stored as agreement data 303. A CA server stores a replication agreement for each CA server it has a relation with. For example, CA Server-A 107 stores a replication agreement for CA Server-B 109, a replication agreement for CA Server-C 111, and a replication agreement for CA Server-n 119 in agreement data 303. Each replication agreement identifies the database or fractions of the database to replicate and the CA servers to which the data is pushed.

The authenticator 301 uses the agreement data 303 to establish a connection between the requester CA server and the provider CA server. The agreement data 301 includes credentials that enable a CA server to log in to another CA server. A requester CA server uses the credential in the agreement data 301 for logging in to the provider CA server to obtain unused serial numbers from the provider CA server. An authenticator 301 accesses the agreement data 303 stored in the LDAP-based database 117A to determine whether a requester CA server has a replication agreement with a provider server.

A SNMS 300 can store serial number data 305. Similar to serial number data 221 in FIG. 2, serial number data 305 includes a replicated range subtree 223. Although not illustrated in FIG. 3, there is one entry for each CA server in the ranges subtree 223. Examples of the data included in an entry for a CA server include a Server ID 227, a Next Serial Number 229 for the CA server, an Ending Serial Number 231, a Number Unused 233, and Zone 235 data for the CA server. Also similar to SNMS 200 in FIG. 2, SNMS 300 can include a threshold 247, timeout period 249, and a change log 251.

The server identifier 207, the range manager 211, the replicator 213, the counter 203, the threshold manager 219, the timeout manager 215, the authenticator 301, and the conflict resolver 317 can be implemented as hardware, computer-implemented software, firmware or a combination thereof. In one embodiment, server identifier 207, the range manager 211, the replicator 213, the counter 203, the threshold manager 219, the timeout manager 215, the authenticator 301, and the conflict resolver 317 comprise instructions stored in memory 804 that cause a processing device 802 in FIG. 8 described in greater detail below to perform the functions of server identifier 207, the range manager 211, the replicator 213, the counter 203, the threshold manager 219, the timeout manager 215, the authenticator 301, and the conflict resolver 317.

Figure 4:
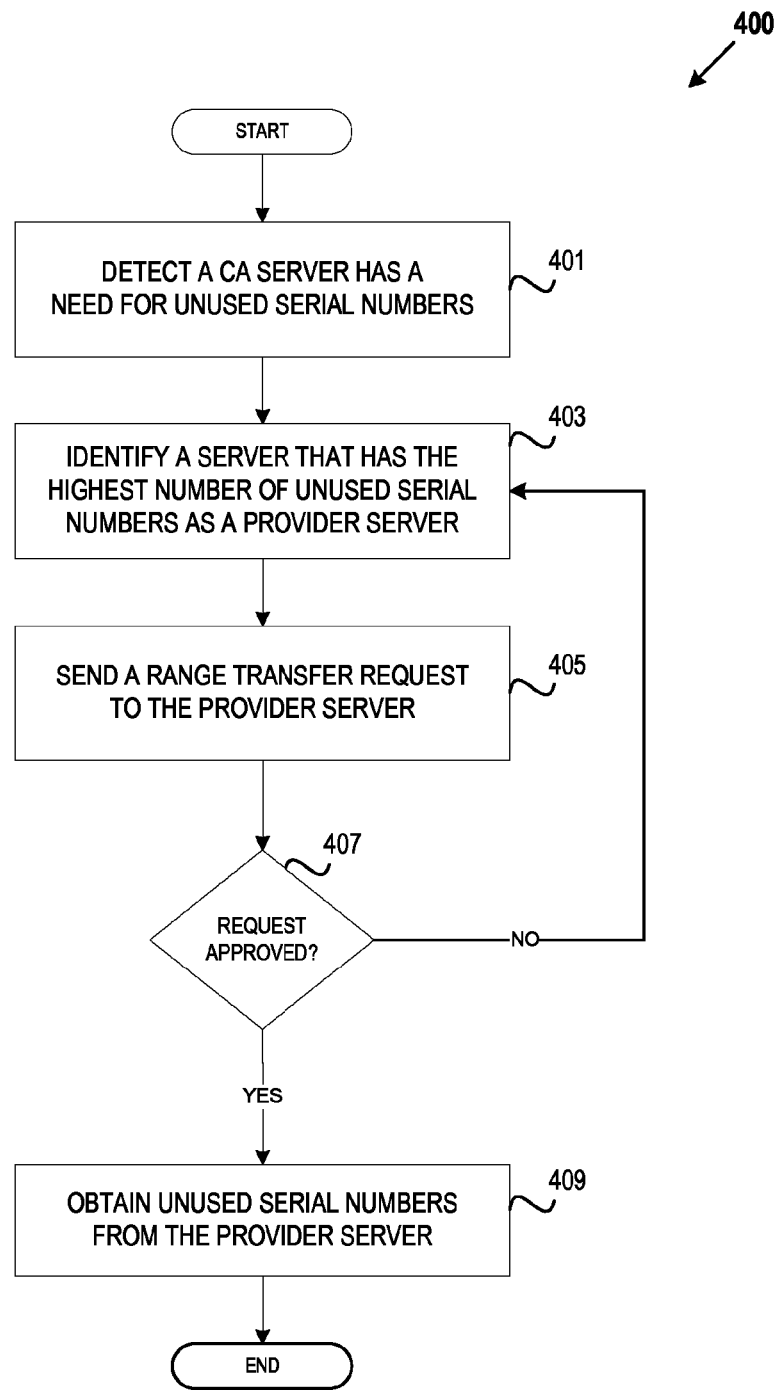
FIG. 4 is a flowchart which illustrates an embodiment of a method for automatically requesting and obtaining additional serial numbers.

FIG. 4 is a flowchart which illustrates an embodiment of a method 300 for automatically detecting that a CA server has a need for unused serial numbers and obtaining unused serial numbers in an environment having multiple certificate authority servers. Method 400 can be performed by processing logic that can comprise hardware (e.g., circuitry, dedicated logic, programmable logic, microcode, etc.), software (e.g., instructions run on a processing device), or a combination thereof. In one embodiment, method 400 is performed by the SNMS 200 in a CA server 107-113 of FIGS. 1 and 2.

In one embodiment, this method can be initiated by a CA server automatically detecting (without user interaction) that it has a need for unused serial numbers at block 401. A CA server that has a need for unused serial numbers is a requester CA server. A CA server may detect that it has a need for unused serial numbers when the CA server is newly installed and does not have any serial numbers. A CA server may also detect that it has a need for unused serial numbers when the number of unused serial numbers of the CA server meets a low-water mark threshold.

At block 403, the requester CA server identifies a server that has the highest number of unused serial numbers. A CA server that has the highest number of unused serial numbers is a provider CA server. The provider CA server can potentially provide unused serial numbers to a requester CA server. The requester CA server can determine which CA server in the replication domain has the highest number of unused serial numbers by searching the entries for each CA server in the ranges subtree.

At block 405, the CA server sends a range transfer request to the provider server requesting that the provider server transfer a portion of its unused serial numbers to the requester CA server.

At block 407, the requester CA server determines whether the request was approved by the provider CA server. If the was not approved (block 407), the requester CA server returns to block 403 to identify the CA server having the next highest number of unused serial numbers as a new provider CA server. The requester CA server continues to block 405 to send a range transfer request to the new provider CA server. If the request was approved (block 407), the requester CA server obtains unused serial numbers from the provider CA server at block 409 and the method completes.

FIG. 5 is a flowchart which illustrates an embodiment of a method 500 for automatically requesting and obtaining additional serial numbers in an environment having multiple certificate authority servers. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by the SNMS 200 on a CA server 107-113 of FIGS. 1 and 2.

In one embodiment, this method can be initiated by a CA server monitoring its number of unused serial numbers at block 501. Each CA server is assigned a unique range of serial numbers. The CA server can store data of its current serial number range assignment and its number of unused serial numbers. The CA server can store the data in a replicated range subtree in an LDAP-based database. The entry can be replicated to all of the other CA servers in a domain (replication domain). The replication of an entry to the CA servers in a replication domain allows each CA server to determine from the entry which serial numbers ranges are being used, which serial number ranges are unused, and which of the CA servers has the highest number of serial numbers that are unused. For example, the CA server can store the data in a replicated subtree "ou=Ranges, $basedn." There is one entry for each CA server in the replication domain. An entry can include a unique server ID, the current range assignment of the CA server, the next range unused, and the number of serial numbers unused. In one embodiment, an entry includes a zone field to define a zone of preferred CA servers. Table 1 below illustrates an example of a format for a range subtree entry.

TABLE 1 serverId: hostname: port
currentRange: <low>:<high>
nextRange: <low> <high> (multi-valued)
certAvailable: (current range + next range − used)
zone The range assignment for an initial CA server is a number that represents a fixed total number of serial numbers that can be used by the CA Servers-A,B,C to n in a replication domain to fulfill certificate requests. For example, a system administrator may assign a serial number range of 1 to 1,000,000 to CA Server-A, the initial CA server. There is a total of 1,000,000 serial numbers that is to be shared amongst CA Servers-A,B,C to n. When the CA Server-A is cloned, it shares a portion of its range assignment with the cloned CA servers. Subsequently, the CA Server-A may have a current range assignment of 1 to 500,000. The number "1" can be the low value and the number "500,000" can be the high value in the Current Range field in the range subtree. The CA Server-A can have a null value for the Next Range field until it receives a next range assignment. In time, the CA Server-A issues 125,000 certificates and thus, uses the serial numbers from 1 to 125,000. CA Server-A has 375,000 unused serial numbers. The number of unused serial numbers for a CA server can be calculated as the number of serial numbers in the current range assignment plus the number of serial numbers in the next range assignment minus the number of used serial numbers.

At block 503, the CA server automatically detects that it has a need for unused serially number by comparing its number of unused serial numbers to a low-water mark threshold to determine whether its number of unused serial numbers meets the low-water mark threshold. A CA server that has met a low-water mark threshold is a requester CA server. A requester CA server has a need for additional unused serial numbers. The threshold (e.g., 100) can be stored in the LDAP-based database. If the CA server has not met the low-water mark threshold (block 503), and the CA server returns to block 501 to continue to monitor its number of unused serial numbers. If the CA server determines that its number of unused serial numbers meets a low-water mark threshold (block 503), the CA server is triggered to obtain additional unused serial numbers. For example, in time, the CA Server-A issues a total of 499,900 certificates and thus, uses the serial numbers from 1 to 499,900. CA Server-A has 100 unused serial numbers and meets the low-water mark threshold at block 503.

At block 505, the requester CA server identifies a server in the replication domain has the highest number of unused serial numbers. A provider CA server is a server that can potentially provide additional serial numbers to a requester server. The requester CA server can search the entries for each CA server in the ranges subtree. For example, CA Server-A is a requester server and determines that CA Server-B has 50,000 unused serial numbers, CA Server-C has 70,000 unused serial numbers, and CA Server-D has 100,000 unused serial numbers. At block 505, CA Server-A identifies CA Server-D as the provider server since CA Server-D has the highest number of unused serial numbers. In one embodiment, a range entry includes a zone field that defines a list of preferred CA servers. A requester CA server can first examine the zone of preferred CA servers for the CA server in the zone having the highest number of unused serial numbers.

At block 507, the requester CA server creates a range transfer request that identifies the provider server. A requester CA server can create the Range transfer request by inserting an entry in a replicated Requests subtree (e.g., "ou=Requests, ou=Ranges, $basedn"). A range transfer request entry can include a requester server ID, a provider server ID, a time stamp, range granted data, and action data. Table 2 below illustrates an example of a format for a range transfer request entry.

TABLE 2

Requester ServerID
Provider ServerID
Timestamp
Range Granted <begin> <end>
Action: Approved/Rejected/TimedOut At block 509, the requester CA server replicates the range transfer request entry to the other CA servers in the replication domain. As the range transfer request entry is replicated amongst the CA servers in the replication domain, the entry will ultimately be replicated to the LDAP-based database of the provider server.

At block 511, the requester CA server determines whether a timeout period has expired. The timeout period can be a user-defined time period (e.g., 10 seconds). For example, the requester CA may have started a timeout period when the requester CA replicated the request to the other CA servers at block 509. If the timeout period expires (block 511), the requester CA returns to block 505 to identify the CA server with the next highest number of unused serial numbers as a new provider server. If the timeout period did not expire (block 511), the requester CA determines whether a response to the range transfer request was received at block 513.

If the requester CA server did not receive a response (block 513), the requester CA server returns to block 511 to determine whether the timeout period has expired. If the requester CA server did receive a response (block 513), the requester CA server determines whether the Requester Server ID in the response matches the its server ID at block 515. In some cases, a response can be received after a timeout period has expired. If the requester CA server receives a response after a timeout period has expired, the response can indicate that the request has been rejected due to it being timed out. An Action field in the entry (previously illustrated in Table 2 above) can include "TimedOut."

If the Requester Server ID for requester CA server does not match (block 515), the requester CA server returns to block 511 to determine whether the timeout period has expired. If the Requester Server ID for requester CA server does match (block 515), the requester CA server determines whether the request was approved at block 517.

The requester CA server can determine whether the request was approved by examining the Action field in the entry (as illustrated in Table 2 above). The Action field can indicate "Approved" or "Rejected." If the request was rejected (block 517), the requester CA returns to block 505 to identify the server with the next highest number of unused serial numbers as a new provider server. For example, the provider CA server may not grant a range transfer request because transferring a portion of its unused serial numbers to the requester CA server may cause the provider CA to meet a low-water mark threshold that would cause the provider CA server to have a need for additional unused serial numbers.

If the request was approved (block 517), the requester CA server updates its stored range assignment data at bock 519 to reflect the range that was transferred from the provider server and the method completes. The requester CA server can examine the Range Granted field in the response to determine the range of the additional unused serial numbers that was granted by the provider CA server. The requester CA server can update its stored range assignment data by updating its next range field in the Ranges subtree (as illustrated in Table 1 above).

If at any time, a requester CA server returns to block 505 to identify the server with the next highest number of unused serial numbers as a new provider server and creates a new request at block 507, and the requester CA server eventually receives a response to an older request after the new request was replicated at block 509, the CA server can delete the new request (not shown).

Figure 6:
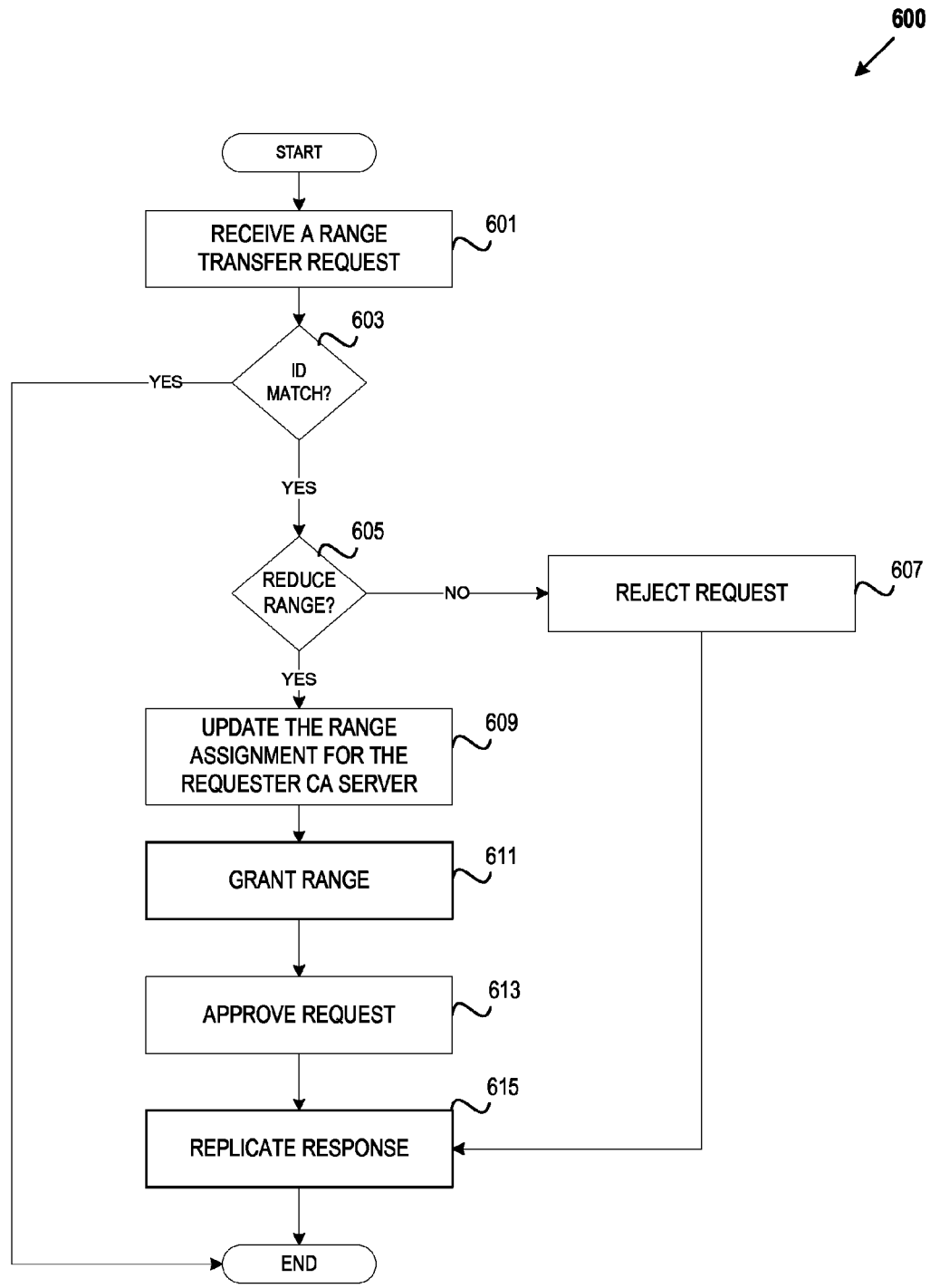
FIG. 6 is a flowchart which illustrates an embodiment of a method for automatically receiving and responding to a request for additional serial numbers.

FIG. 6 is a flowchart which illustrates an embodiment of a method 600 for automatically receiving and responding to a request for additional unused serial numbers in an environment having multiple certificate authority servers. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the SNMS 200 a CA server 107-113 of FIGS. 1 and 2. In one embodiment, this method can be initiated by a CA server receiving a range transfer request for additional serial numbers at block 601. The request can be in the form of data in a subtree in an LDAP-based database that is being replicated to all of the CA servers in a replication domain. For example, the range transfer request can be in the form of a range transfer request entry as illustrated in Table 1 above.

At block 603, the CA server determines whether the Provider Server ID in the request matches its server ID. If the Provider Server ID does not match the server ID of the CA server (block 603), the method completes. If the Provider Server ID does match the server ID for the CA server (block 603), the CA server determines it is a provider server and the intended recipient of the range transfer request.

At block 605, the provider CA server determines whether it can reduce its number of unused serial numbers in order to transfer a portion of its unused serial numbers to the requester CA server and approve the request. The provider CA server determines whether transferring a portion of its unused serial numbers to the requester CA server will cause the provider CA to meet a low-water mark threshold that would cause the provider CA server to have a need for additional unused serial numbers. In such a case, the provider CA server can reject the range transfer request. For example, provider CA server may have 3000 unused serial numbers and a low-water mark threshold of 1500. If the provider CA server transfers 1500 of its 3000 unused serial numbers, the provider CA will have 1500 unused serial numbers remaining, which would meet the low-water mark threshold and cause the provider CA server to have a need for additional unused serial numbers. The provider CA server can reject the request. Alternatively, the provider CA server can grant a portion of its unused serial number (e.g., less than 1500) to avoid having a need for additional unused serial numbers.

If the provider CA server determines it cannot reduce its number of unused serial numbers (block 605), the provider CA server rejects the request at block 607. The provider CA server can reject the request by updating the Action field in the range transfer request entry to "Rejected." The provider CA server continues to block 615 to replicate the response that rejects the range transfer request to all of the CA servers in the replication domain and the method completes.

If the provider CA server determines that it can reduce its number of unused serial numbers (block 605), the provider CA server updates its stored range assignment data to reflect the range that will be transferred to the requester CA server at block 609. The provider CA server can update its stored range assignment data by updating its next range field in the Ranges subtree (as illustrated in Table 1 above).

At block 611, the provider CA server grants a portion of its unused serial numbers to the requester CA server. The provider CA server can grant the additional unused serial numbers to the requester CA server by updating the Range Granted field in the range transfer request entry.

At block 613, the provider CA server approves the request. The provider CA server can approve the request by updating the Action field in the range transfer request entry to "Approved." The provider CA server continues to block 615 to replicate the response that approves the range transfer request to all of the CA servers in the replication domain and the method completes.

Figure 7:
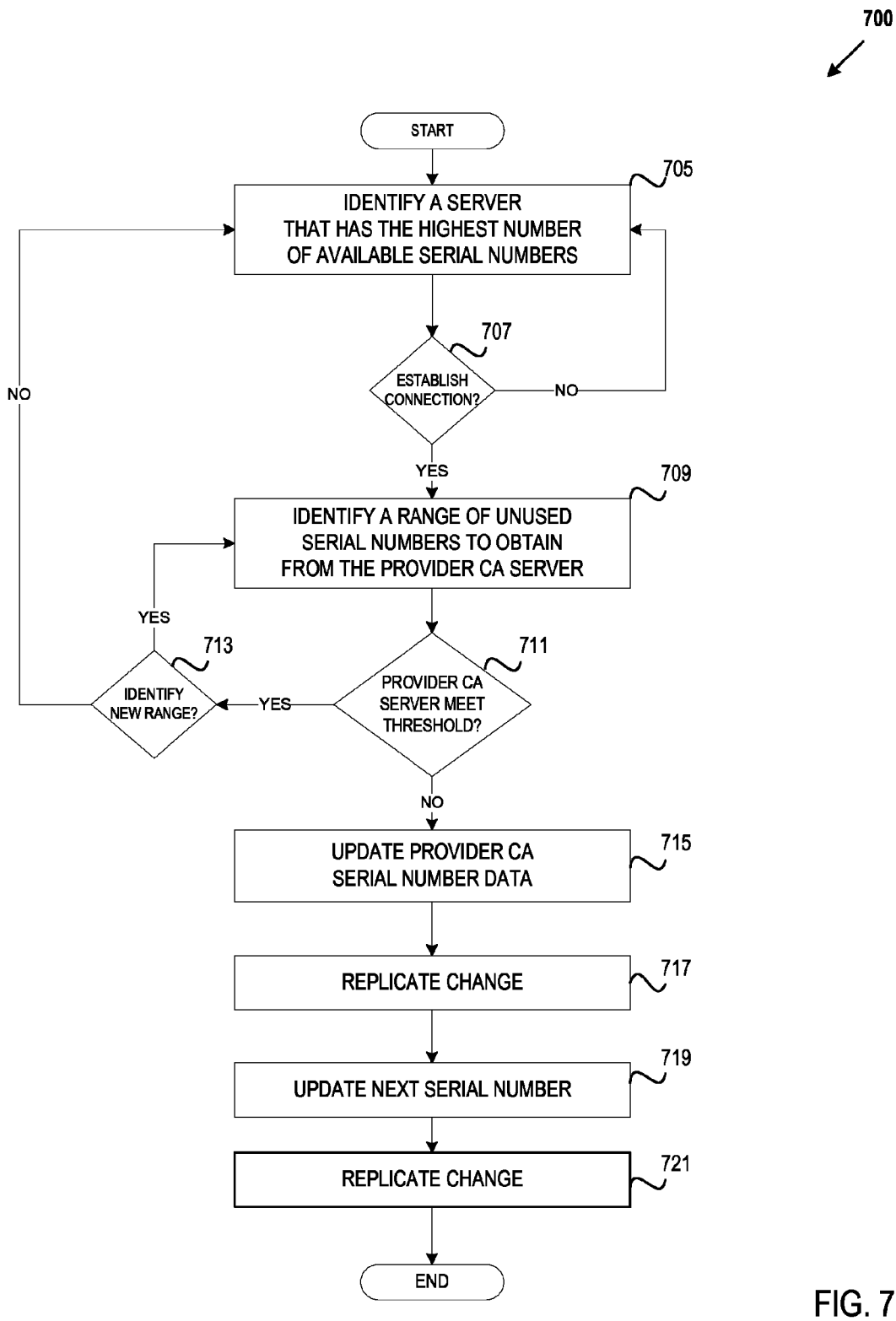
FIG. 7 is a flowchart which illustrates an embodiment of a method for automatically requesting and obtaining additional serial numbers.

FIG. 7 is a flowchart which illustrates an embodiment of a method 700 for automatically requesting and obtaining additional serial numbers in an environment having multiple certificate authority servers. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the SNMS 300 on a CA server 107-113 of FIG. 3. In one embodiment, this method can be initiated by a CA server identifying a CA server that has the highest number of unused serial numbers at block 705 similar to block 505 in FIG. 5. Blocks 701 and 703 (not shown) are similar to blocks 501 and 503 in FIG. 5.

Returning to method 700, at block 707, the requester CA server determines whether a connection with the provider CA server is established. For example, the requester CA attempts to log in to the provider CA server using credential data in the agreement data stored with the requester CA server. If the requester CA server cannot establish a connection with the provider CA server, the requester CA server returns to block 705 where the requester CA server identifies a new provider CA server (a CA server having the next highest number of unused serial numbers). For example, the requester CA server may not have a replication agreement with a provider CA server and cannot establish a connection with the provider CA server at block 707. In another example, the requester CA server may not establish a connection with a provider CA server because the provider CA server is unavailable at block 707. In one embodiment, at block 707, the requester CA starts a timeout period to determine if the provider CA is available. The requester CA can determine that the provider CA is not available by determining that the timeout period has expired at block 711 and the requester CA did not receive a response from the provider CA. If the requester CA server does establish a connection with the provider CA server, the requester CA server is logged in as privileged user of the provider CA and continues to block 709.

At block 709, the requester CA server identifies a portion of unused serial number to obtain from the provider CA server. At block 711, the requester CA server determines whether obtaining the portion of unused serial number causes the provider CA server to meet a low-water mark threshold. For example, transferring a portion of the provider CA server's unused serial numbers to the requester CA server may cause the provider CA to have a need for additional unused serial numbers.

If the requester CA determines that the provider CA server will meet a low-water mark threshold (block 711), the requester CA server determines whether to identify a new (e.g., smaller) portion of unused serial numbers to obtain from the provider CA server at block 713. If the requester CA server will identify a new portion (block 713), the requester CA server returns to block 709 to identify a new portion of unused serial numbers to obtain from the provider CA server. If the request CA server will not identify a new portion (block 13), the requester CA server returns to block 705 to identify a new provider CA server (a CA server having the next highest number of unused serial numbers).

If the requester CA determines that the provider CA server will not meet a low-water mark threshold (block 711), the requester CA server (as a privileged user of the provider CA) updates the provider CA server serial number data at block 715. At block 717, the change made to the provider CA server serial number data is replicated to the other CA servers in the replication domain. At block 719, the requester CA server updates its stored range assignment data to reflect the range that was transferred from the provider server at block 715. The requester CA server can update the next range field in the range subtree in the LDAP-based database. At block 721, the requester CA server replicates the change it made to the next range field to the other CA servers in the replication domain and the method completes.

Figure 8:
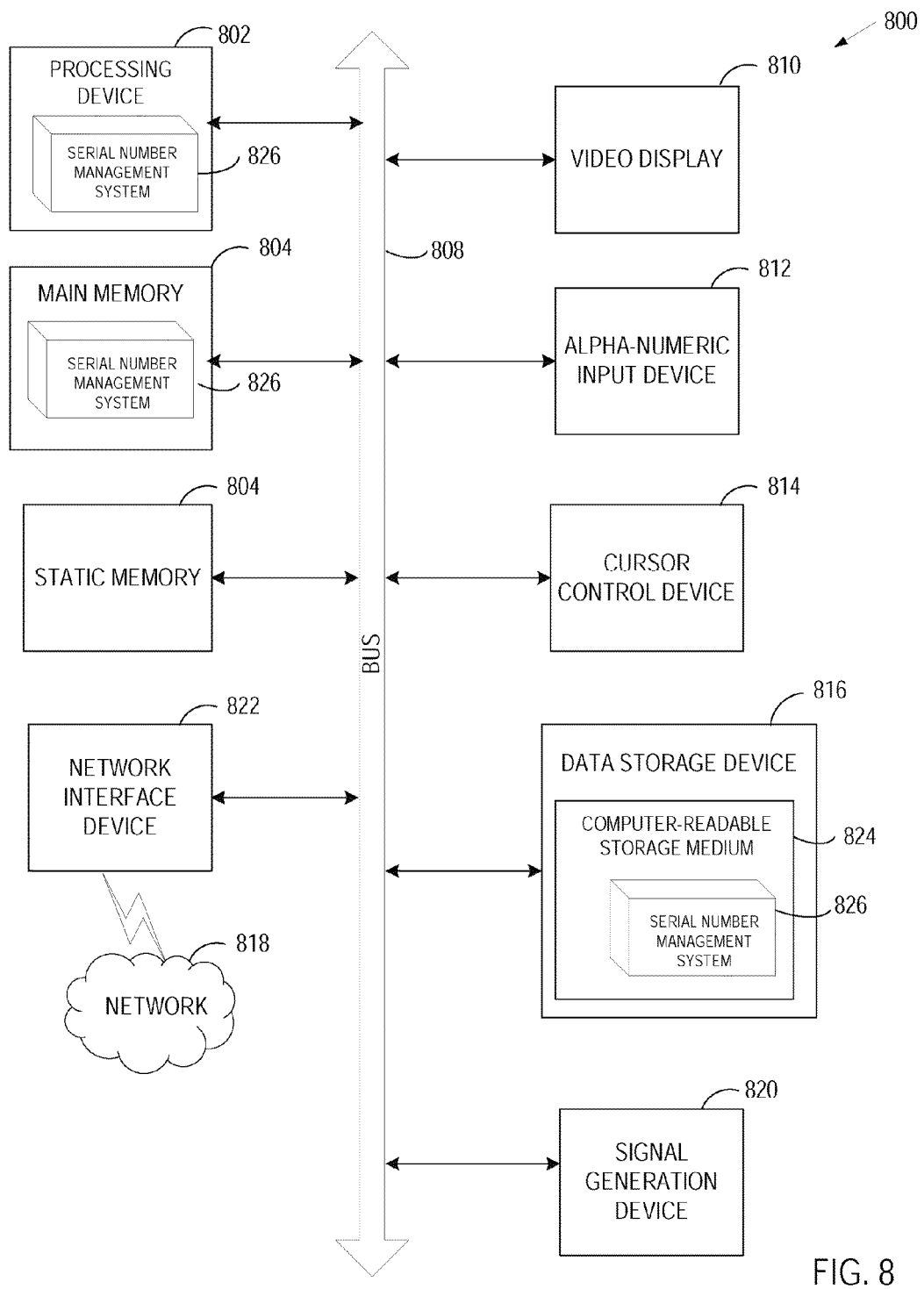
FIG. 8 is a diagram of one embodiment of the serial number management system.

FIG. 8 is a diagram of one embodiment of a computer system for automatically managing the allocation of unique certificate serial numbers to certificate authority servers in a replicated server environment. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the serial number management system 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions (e.g., the serial number management system 826) embodying any one or more of the methodologies or functions described herein. The serial number management system 826 may also reside, completely or at least partially, within the main memory 804 and/or within the processing device 802 during execution thereof by the computer system 800, the main memory 804 and the processing device 802 also constituting machine-readable storage media. The serial number management system 826 may further be transmitted or received over a network 818 via the network interface device 822.

The computer-readable storage medium 824 may also be used to store the serial number management system 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The serial number management system 826, components and other features described herein (for example in relation to FIG. 2) can be implemented as discrete hardware components or integrated in the functionality of hardware components such as ASICS, FPGAs, DSPs or similar devices. In addition, the serial number management system 826 can be implemented as firmware or functional circuitry within hardware devices. Further, the serial number management system 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting", "identifying," "obtaining," "determining," "sending," "creating," "replicating," "receiving," "maintaining," "logging in," "requesting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for automatically managing the allocation of unique certificate serial numbers to certificate authority servers in a replicated server environment has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method, implemented by a certificate authority (CA) server computing system programmed to perform the following, comprising:
    determining, by the CA server computing system, that the CA server computing system has a need for at least one unassigned serial number;
    identifying, by the CA server computing system, a provider server from a plurality of servers in a replication domain, wherein the provider server has at least one unassigned serial number; and
    obtaining, by the CA server computing system, at least one unassigned serial number from the provider server, wherein the at least one unassigned serial number has not been assigned to a certificate.

2. The method of claim 1, wherein determining a need comprises:
    determining, by the CA server computer system, a number of unassigned serial numbers that correspond to the CA server computing system meets a low-water mark threshold.

3. The method of claim 1, wherein each of the plurality of servers maintains a Lightweight Directory Access Protocol (LDAP)-based database and stores a number of unassigned serial numbers entry in the LDAP-based database that corresponds to the server, wherein the number of unassigned serial numbers entry that corresponds to the server is replicated to the other LDAP-based databases.

4. The method of claim 1, wherein identifying a provider server comprises:
    determining, by the CA server computing system, which of the plurality of servers has a highest number of unassigned serial numbers; and
    identifying, by the CA server computing system, the server that has the highest number of unassigned serial numbers as the provider server.

5. The method of claim 1, wherein obtaining the at least one unassigned serial numbers comprises:
    sending, by the CA server computing system, a request to obtain the at least one unassigned serial number from the provider server;
    determining, by the CA server computing system, whether the request is approved by the provider server; and
    obtaining, by the CA server computing system, the at least one unassigned serial number from the provider server in response to a determination that the provider server approved the request.

6. The method of claim 5, further comprising:
    identifying, by the CA server computing system, a different server from the plurality of servers as a new provider server in response to a determination that the provider server did not approve the request.

7. The method of claim 5, wherein sending a request comprises:
    creating, by the CA server computing system, a request entry in an LDAP-based database that corresponds to the CA server computing system, wherein the request entry identifies the provider server; and
    replicating, by the CA server computing system, the request entry to a plurality of LDAP-based databases, wherein each of the plurality of LDAP-based databases corresponds to one of plurality of servers.

8. The method of claim 5, wherein determining whether the request is approved comprises:
    receiving, by the CA server computing system, a response to the request;
    determining, by the CA server computing system, whether a server identifier (ID) of the CA server computing system matches a server ID in the response; and
    determining, by the CA server computing system, whether an action field in the response indicates the request was approved by the provider server if server ID of the CA server computing system matches the server ID in the response.

9. The method of claim 1, wherein obtaining the at least one unassigned serial number from the provider server comprises:
    maintaining, by the CA server computing system, a replication agreement between the CA server computing system and the provider server, wherein the replication agreement comprises credentials that enable the CA server computing system to log in to the provider server;
    logging in, by the CA server computing system, to the provider server using the credentials; and
    requesting, by the CA server computing system, a portion of a range of unassigned serial numbers that correspond to the provider server from the provider server.

10. A non-transitory computer-readable storage medium including instructions that, when executed by a computer system, cause the computer system to perform a set of operations comprising:
    determining that a certificate authority (CA) server computing system has a need for at least one unassigned serial number;
    identifying a provider server from a plurality of servers in a replication domain, wherein the provider server has at least one unassigned serial number; and
    obtaining at least one unassigned serial number from the provider server, wherein the at least one unassigned serial number has not been assigned to a certificate.

11. The non-transitory computer-readable storage medium of claim 10, wherein determining a need comprises:
    determining a number of unassigned serial numbers that correspond to the CA server computing system meets a low-water mark threshold.

12. The non-transitory computer-readable storage medium of claim 10, wherein each of the plurality of servers maintains an LDAP-based database and stores a number of unassigned serial numbers entry in the LDAP-based database that corresponds to the server, wherein the number of unassigned serial numbers entry that corresponds to the server is replicated to the other LDAP-based databases.

13. The non-transitory computer-readable storage medium of claim 10, wherein identifying a provider server comprises:
    determining which of the plurality of servers has a highest number of unassigned serial numbers; and identifying the server that has the highest number of unassigned serial numbers as the provider server.

14. The non-transitory computer-readable storage medium of claim 10, wherein obtaining at least one unassigned serial numbers comprises:
sending a request to obtain the at least one unassigned serial number from the provider server;
determining whether the request is approved by the provider server; and
obtaining the at least one unassigned serial number from the provider server in response to a determination that the provider server approved the request.

15. The non-transitory computer-readable storage medium of claim 14, further comprising:
identifying a different server from the plurality of servers as a new provider server in response to a determination that the provider server did not approve the request.

16. The non-transitory computer-readable storage medium of claim 14, wherein sending a request comprises:
creating a request entry in an LDAP-based database that corresponds to the server, wherein the request entry identifies the provider server; and
replicating the request entry to a plurality of LDAP-based databases, wherein each of the plurality of LDAP-based databases corresponds to one of the plurality of servers.

17. The non-transitory computer-readable storage medium of claim 14, wherein determining whether the request is approved comprises:
receiving a response to the request;
determining whether a server identifier (ID) of the CA server computing system matches a server ID in the response; and
determining whether an action field in the response indicates the request was approved by the provider server if server ID of the CA server computing system matches the server ID in the response.

18. The non-transitory computer-readable storage medium of claim 10, wherein obtaining the at least one unassigned serial number from the provider server comprises:
maintaining a replication agreement between the CA server computing system and the provider server, wherein the replication agreement comprises credentials that enable the CA server computing system to log in to the provider server;
logging in to the provider server using the credentials; and
requesting a portion of a range of unassigned serial numbers that correspond to the provider server from the provider server.

19. A system comprising:
a memory; and
a processing device coupled with the memory to determine that the a certificate authority (CA) server computing system has a need for at least one unassigned serial number;
identify a provider server from a plurality of servers in a replication domain, wherein the provider server has at least one unassigned serial number; and
obtain at least one unassigned serial number from the provider server, wherein the at least one unassigned serial number has not been assigned to a certificate.

20. The system of claim 19, wherein to determine a need comprises:
determining a number of unassigned serial numbers that correspond to the CA server computing system meets a low-water mark threshold.

21. The system of claim 19, wherein each of the plurality of servers maintains a Lightweight Directory Access Protocol (LDAP)-based database and stores a number of unassigned serial numbers entry in the LDAP-based database that corresponds to the server, wherein the number of unassigned serial numbers entry that corresponds to the server is replicated to the other LDAP-based databases.

22. The system of claim 19, wherein to identify a provider server comprises:
determining which of the plurality of servers has a highest number of unassigned serial numbers; and
identifying the server that has the highest number of unassigned serial numbers as the provider server.

* * * * *